3,361,725
PROCESS FOR PREPARATION OF SOLUTION
BUTYL RUBBERS USING A MAJOR AMOUNT
OF AlR$_2$X AND A MINOR AMOUNT OF AlRX$_2$
AS CATALYST
Paul Thomas Parker, Baton Rouge, La., and James
A. Hanan, Oklahoma City, Okla., assignors to Esso
Research and Engineering Company, a corporation
of Delaware
No Drawing. Filed June 2, 1965, Ser. No. 460,861
12 Claims. (Cl. 260—85.3)

This invention is directed to an improved, catalytic, solution process for preparing solutions of butyl rubber polymers in good conversions, said polymers having viscosity average molecular weights of greater than 450,000 equivalent to a three-minute Mooney viscosity of greater than about 35 at 260° F. at very economical polymerization temperatures of —125° F. to about —50° F. in a readily controlled process enabling the use of low cost, inert, aliphatic hydrocarbon solvents.

More specifically, the present invention is directed to the preparation of butyl rubber polymers having viscosity average molecular weights of greater than 500,000 equivalent to a three-minute Mooney viscosity of greater than about 40 @ 260° F. by reacting a $C_4$ to $C_8$ olefin monomer, preferably a $C_4$ to $C_8$ isoolefin with a $C_4$ to $C_{14}$ multiolefin monomer, preferably a $C_4$ to $C_{10}$ conjugated diolefin monomer, at temperatures ranging from about —125° F. to —50° F. in the presence of an aliphatic hydrocarbon diluent in which said polymers are soluble and a catalyst mixture comprising: (A) a major amount, e.g., 0.01 to 2.0 wt. percent of a dialkyl aluminum halide, and (B) a minor amount, e.g., 0.002 to 0.4 wt. percent of a mono alkyl aluminum dihalide (said weight percents based on the total of said polymerizable monomers present) with the mono alkyl aluminum dihalide always representing no more than about 20 mole percent of the catalyst mixture (based on monohalide plus dihalide).

Conventional prior art processes for preparing butyl rubber polymers in solution (solution butyl processes) chiefly employ aluminum trihalide catalyst systems, viz, those using aluminum trichloride, or aluminum tribromide alone. For example see U.S. Patent 2,356,128. These conventional prior art procedures are not wholly satisfactory because they are performed at very low temperatures, e.g., —135° F. to —170° F. leading to high refrigeration maintenance costs during polymerization. Moreover, such conventional procedures frequently cause the polymerization reaction to take place in too rapid a fashion thereby causing gelation to occur which results in the fouling of reactor equipment and lines. Furthermore, these aluminum trihalide catalytic processes do not consistently produce the more desirable high molecular weight polymers, viz, those having a molecular weight of 450,000+ (based on viscosity average molecular weights) even when the more expensive, much lower temperatures are used.

The discovery that mixtures of dialkyl aluminum halides, e.g., dialkyl aluminum chlorides, and mono alkyl aluminum dihalides, e.g., mono alkyl aluminum dichlorides (in which the latter component is present in small amounts) are effective solution butyl rubber catalysts, operate at the far more economical (higher) temperatures and form excellent high molecular weight butyl rubber product, was most surprising. This is the case because dialkyl aluminum monohalides, e.g., dialkyl aluminum chlorides such as diethyl aluminum chloride, alone, do not catalyze butyl rubber polymerization. In order to polymerize butyl rubber using diethyl aluminum chloride an activator such as tertiary-butyl chloride, benzyl chloride, etc., must be used.

The other component of the catalyst system of the present invention also is unsatisfactory, alone, in solution butyl rubber polymerization catalysis because of several drawbacks. For example, in order to secure butyl rubber polymers having viscosity average molecular weights of 450,000+ and using the monoalkyl aluminum dichloride, e.g. ethyl aluminum dichloride, alone, one is forced to employ the more expensive lower temperatures, e.g., from about —130° F. and below.

At temperatures below —130° F., solutions of butyl rubber in hydrocarbon solvents are extremely viscous. This makes the reactor contents difficult to mix efficiently, cuts down on the heat transfer rate so that the temperature is difficult to control, and increases the tendency to fouling. Thus, it is necessary to limit conversion levels to low values with the attendant loss of production rate. Attempts using the mono alkyl aluminum dihalide catalyst, alone, to achieve increased polymer production rate and employ higher (and more economical) polymerization temperatures resulted in polymers having far lower molecular weights than desired.

Hence, the ability of mixtures of from about 80 to about 99 mole percent of the dialkyl aluminum mono chloride with from about 1 to about 20 mole percent of a mono alkyl aluminum dichloride to catalyze effectively the polymerization of butyl rubber at economical temperatures of —125° F. to about —50° F. was most surprising.

The above and other advantages are obtained in accordance with this invention by polymerizing the isoolefin and multiolefin at temperatures of between about —125 and —50° F. in the presence of an inert aliphatic hydrocarbon solvent diluent and the catalyst mixture described herein at pressures which are at or near atmospheric pressure for time periods ranging from about 1 to 120 minutes. Usually, the butyl rubber polymerizations using the present catalyst mixtures are conducted at temperatures ranging from about —125 to —70° F., and preferably at temperatures of —110 to —90° F., with excellent results being achieved with temperatures at or near —100° F. at approximately atmospheric pressure. Pressures of 0 to about 5 p.s.i.g. are preferred, the instant polymerization reactions can be conducted at pressures ranging from 0 to 100 p.s.i.g., and more usually from 0 to 10 p.s.i.g.

Suitable aliphatic hydrocarbon diluents which can be used in accordance with the solution butyl polymerization process in accordance with this invention include, but are not limited to, the following: $C_4$ to $C_8$ saturated aliphatic and alicyclic hydrocarbons, such as pentane, isopentane, hexane, heptane, isooctane, methylcyclohexane cyclohexane, etc.

The polymers are soluble in the unreacted monomers as well, so that relatively minor amounts of diluent can be used which decreases the amount of diluent that needs to be distilled and dried in the recycle system of a continuous process. Because the catalyst mixture of the present invention and the polymers produced are soluble in not only the above aliphatic hydrocarbon diluents, but also the monomers being reacted, reasonably small quantities of diluent can be employed, e.g., from 0 to 50 vol. percent diluent based on total volume of monomer and saturated hydrocarbon catalyst solvent. Usually, however, the concentration of diluent during polymerization ranges from 0 to 20 vol. percent, and more preferably from 0 to 15 vol. percent. The ability, according to this invention, to use small concentrations of diluent during polymerization constitutes an economic advantage. The diluents usually employed to conduct the solution butyl polymerization reaction are $C_5$ to $C_6$ normal, iso, and cyclo paraffinic hydrocarbons which are liquids at the reaction temperatures and pressures employed. Preferably the $C_5$ and $C_6$ normal paraffins are used, viz, n-pentane and n-hexane.

The term "diluent" as employed herein is inclusive of the role played by the saturated hydrocarbons in decreasing the viscosity of the reaction mixture to maintain adequate fluidity for efficient mixing at the reaction temperatures contemplated herein. The same saturated hydrocarbons serve as "solvents" for the catalyst mixture.

The catalyst mixture, which is an essential feature of the present butyl rubber solution process, consists of a mixture of 1 to 20 mole percent of a monoalkyl aluminum dihalide and 80 to 99 mole percent of a dialkyl aluminum monohalide. Usually the catalyst mixture will consist of from about 1 to about 15 mole percent of the dialkyl aluminum monohalide and from about 85 to 99 mole percent of the dialkyl aluminum monohalide. Preferably, however, and in order to achieve the most advantageous combination of ease of polymerization coupled with catalyst efficiency and good temperature control over the polymerization reaction; the catalyst mixture consists of from about 2 to about 10 mole percent of the monoalkyl aluminum dihalide and from about 90 to 98 mole percent of the dialkyl aluminum monohalide.

Usually the dialkyl aluminum monohalide employed in accordance with this invention will be a $C_2$ to $C_{16}$ low molecular weight dialkyl aluminum monochloride, wherein each alkyl group contains from 1 to 8 carbon atoms. Preferably $C_2$ to $C_8$ dialkyl aluminum chlorides are used, wherein each alkyl group contains from 1 to 4 carbon atoms. Suitable exemplary preferred dialkyl aluminum monochlorides which can be used in accordance with this invention include, but are not limited to, the following: dimethyl aluminum chloride, diethyl aluminum chloride, di n-propyl aluminum chloride, di iso-propyl aluminum chloride, di n-butyl aluminum chloride, di iso-butyl aluminum chloride, or any of the other homologous compounds.

The monoalkyl aluminum dihalides employed in accordance with this invention are $C_1$ to $C_8$ monoalkyl aluminum dihalides, and preferably $C_1$ to $C_4$ mono alkyl aluminum dihalides containing essentially the same alkyl groups as mentioned hereinabove in conjunction with the description of the dialkyl aluminum monochlorides. Suitable exemplary preferred $C_1$ to $C_4$ monoalkyl aluminum dihalides which can be employed satisfactorily in accordance with this invention include, but are not limited to, the following: methyl aluminum dichloride, ethyl aluminum dichloride, propyl aluminum dichlorides, butyl aluminum dichlorides, isobutyl aluminum dichloride, etc.

An additional advantageous feature of this invention is that the catalyst handling is very convenient because the two above compounds of the catalyst mixture can be, and preferably are, premixed and stored. The mixture of these two catalyst components is a stable mixture which can be stored for extended periods of time and then be used directly. It is advisable when employing the catalysts for polymerization, however, to dissolve them in saturated hydrocarbon solvents to form dilute solutions, e.g. containing usually <50 wt. percent catalysts, e.g., below 30 wt. percent catalysts, and preferably <25 wt. percent catalysts.

As mentioned hereinabove, the catalyst mixture and improved process of this invention is directed to the preparation of butyl rubber polymers. The term "butyl rubber" as employed throughout the specification and claims is intended to denote polymers prepared by reacting a major portion, e.g., from about 70 to 99.5 parts by weight, usually 85 to 99.5 parts by weight of an isomonoolefin, such as isobutene, with a minor portion, e.g., about 30 to 0.5 parts by weight, usually 15 to 0.5 parts by weight, of a multiolefin, e.g., a conjugated diolefin, such as butadiene or isoprene, for each 100 weight parts of said monomers reacted. The isoolefin, in general, is a $C_4$ to $C_8$ compound, e.g., isobutene, 2-methyl-1-butene, 3-methyl-1-butene, 2-methyl-2-butene, and 4-methyl-1-pentene.

The conjugated diolefin, in general, is a $C_4$ to $C_{14}$ multiolefin, and more preferably a $C_4$ to $C_{10}$ conjugated diolefin, e.g., butadiene, isoprene, 2,3-dimethyl-1,3-butadiene, myrcene, 6,6-dimethylfulvene, piperylene, etc. The preferred butyl rubber polymers produced in accordance with the improved catalyst mixture and process of this invention are obtained by reacting from about 95 to 99.5 parts by weight of isobutene with from about 0.5 to 5 parts by weight of isoprene.

Cyclodiolefinic compounds, such as cyclopentadiene and methyl cyclopentadiene, as well as compounds such as beta-pinene and divinyl benzene can be copolymerized with the isoolefin and conjugated diolefin. These additional cyclodiolefinic compounds can be incorporated in amounts up to about 6% by weight, based on isoolefin, and more preferably in amounts ranging from about 0.3 to about 2.0 wt. percent. Polymers formed from combinations of the isoolefin, conjugated diolefin, and cyclodiolefinic compounds have improved ozone resistance and compare favorably in molecular weight with the butyl rubber copolymers formed by the isoolefin and conjugated diolefin without the cyclodiolefinic compound.

The monomers and aliphatic or alicyclic hydrocarbon solvents are charged to a reaction vessel and cooled to $-50$ to $-125°$ F., usually from $-70$ to $-120°$ F., and preferably from $-90$ to $-110°$ F. The preformed catalyst mixture in a hydrocarbon solvent as defined above is separately precooled to $-50$ to $-125°$ F., usually from $-70$ to $-125°$ F., and preferably from $-90$ to $-110°$ F., is added in one portion to the well stirred and cooled mixture of monomers and solvent. Shortly thereafter (usually after a minimum initiation period of 1 to 15 minutes), depending on the amount of catalyst used and the purity of the monomers, the butyl rubber polymerization takes place gradually and in controlled manner over a 20 to 120 minute period, usually requiring from about 50 to 100 minutes, and preferably over polymerization periods of 60 to 90 minutes within the preferred temperature range. The resulting butyl rubber copolymers have molecular weights greater than 450,000, usually greater than 500,000, and preferably greater than about 550,000 (based on viscosity average). The reaction time and initiation period are dependent on amount of catalyst added, but best molecular weights are secured when lesser amounts of catalyst are used.

The molecular weights of the butyl rubber copolymers as disclosed herein are obtained from viscosity measurements of a 0.1% polymer solution in diisobutylene at 68° F. The intrinsic viscosities were obtained from a single measurement by the equation:

$$I.V. = \frac{23.03 \times \log_{10} \frac{\text{viscosity of solution}}{\text{viscosity of solvent}}}{\text{milligrams of polymer per ml. of solvent}}$$

The viscosity average molecular weights were determined from the relation:

$$I.V. = 0.00036 \times (\text{viscosity avg. mol. wt.})^{0.6358}$$

The present invention will be described in greater detail in accordance with the following examples, which are intended not as limitative upon the invention, but rather illustrative thereof.

Example 1

In runs 1 through 3, comparative experiments were conducted with only the polymerization reaction time, and concentration of the monoalkyl aluminum dihalide in the catalyst mixture being changed in the runs. Thus, 0.12 wt. percent of diethyl aluminum chloride was mixed wth 0.0067 wt. percent of ethyl aluminum dichloride in heptane at a total concentration of 20 wt. percent alkyl aluminum chloride to form a premixed polymerization catalyst solution in runs 1 and 3, and 0.0033 wt. percent of ethyl aluminum dichloride were similarly mixed in n-heptane solution with 0.12 wt. percent of diethyl aluminum chloride in run 2.

The polymerization solution was prepared by mixing 98 wt. parts of isobutylene and 2 wt. parts of isoprene in 20 wt. parts of n-hexane solvent (99.5+% purity) at $-100°$ F. To the well stirred mixture of monomers and solvent at $-100°$ F. was added the premixed catalyst solution which had been precooled to about $-70°$ F. in Dry Ice. The reaction mixture was maintained at $-100°$ F. throughout the polymerization. Experimental details and the results of runs 1 to 3 are summarized hereinbelow in Table I.

TABLE I.—EVALUATION OF $Et_2AlCl/Et$ AS POLYMERIZATION CATALYST FOR BUTYL RUBBER (ISOBUTYLENE)-ISOPRENE BATCH POLYMERIZATION

| | Run | | |
|---|---|---|---|
| | 1 | 2 | 3 |
| Wt. Percent $Et_2AlCl$ on Monomers | 0.12 | 0.12 | 0.12 |
| Vol. Percent Isobutylene | 83 | 83 | 83 |
| Vol. Percent Hexane | 16 | 16 | 16 |
| Wt. Percent Isoprene on Isobutylene | 2 | 2 | 2 |
| Mole Percent $EtAlCl_2$ on $Et_2AlCl$ | 5 | 2.5 | 2.5 |
| Wt. Percent $EtAlCl_2$ on Monomers | 0.0067 | 0.0033 | 0.0067 |
| Temperature, °F | −100 | −100 | −100 |
| Reaction Time, minutes | 55 | 90 | 90 |
| Results of Polymerization: | | | |
| Conversion of Monomers, Wt. Percent | 24 | 23 | 19 |
| $Et_2AlCl$ Catalyst Efficiency, w./w. | 200 | 192 | 159 |
| Inspections on Polymer: | | | |
| Intrinsic Viscosity, dl./g | 1.594 | 1.706 | 1.962 |
| Viscosity Average Molecular Wt. $\times 10^{-10}$ | 543 | 604 | 752 |
| Mole Percent Unsaturates | 1.29 | 1.48 | 1.33 |
| Gel Content, Wt. Percent | 0.00 | *N.D. | *N.D |
| 3′ Mooney Viscosity at 260° F | 58 | 54 | 76 |

*N.D.=Not Determined.

The data in Table I clearly show that the mixture of diethyl aluminum monochloride with a small amount of ethyl aluminum dichloride catalyzes the polymerization of butyl rubber (isobutylene-isoprene copolymer) to produce a highly desirable high molecular weight butyl rubber having desired 3-minute Mooney viscosity greater than 45 at 260° F. in an all-hydrocarbon reaction system.

Example 2

A test was made to duplicate the butyl rubber polymerization procedure of Example 1, using as the sole catalyst the same amount of ethyl aluminum dichloride in n-heptane solution. The same amounts of isobutylene, isoprene, hexane solvent, etc., were employed. The weight percent of ethyl aluminum dichloride based on monomers was 0.0067. The polymerization temperature was −100° F. as above, and the polymerization reaction time was approximately 60 minutes. The results of this attempted polymerization are summarized along with experimental details and other data in Table II, below.

TABLE II.—EVALUATION OF $Et_2AlCl/EtAlCl_2$ AS POLYMERIZATION CATALYST FOR BUTYL RUBBER (ISOBUTYLENE-ISOPRENE BATCH POLYMERIZATION)

| | |
|---|---|
| Wt. percent $Et_2AlCl$ on Monomers | 0 |
| Volume percent Isobutylene | 83 |
| Volume percent Hexane | 16 |
| Wt. percent Isoprene on Isobutylene | 2 |
| Mole percent $EtAlCl_2$ on $Et_2AlCl$ | |
| Wt. percent $EtAlCl_2$ on Monomers | 0.0067 |
| Temperature, °F | −100 |
| Reaction Time, Minutes | 60 |
| Results of Polymerization: | |
| Conversion of Monomers, Wt. percent | <1 |
| $Et_2AlCl$ Catalyst Efficiency, w./w. | [1] 5 |
| Inspections on Polymer: | |
| Intrinsic Viscosity, dl./g. | (2) |
| Viscosity Average Molecular Wt.$\times 10^{-3}$ | (2) |
| Mole percent Unsaturates | (2) |
| Gel Content, Wt. percent | (2) |
| 3′ Mooney Viscosity at 260° F. | (2) |

[1] On $EtAlCl_2$.
[2] Insufficient product for evaluation.

As will be noted from Table II above, the conversion of monomers to butyl rubber was less than 1 wt. percent accompanied with an extremely inadequate catalyst efficiency. Essentially, only a trace amount of polymer was formed which was insufficient for polymer inspections. Thus, it can be seen that ethyl aluminum dichloride, in the catalyst level used, is not effective as a polymerization catalyst for production of butyl rubber copolymers whereas a mixture of diethyl aluminum monochloride with small amounts of ethyl aluminum dichloride constitutes an extremely effective and efficacious catalyst for butyl rubber polymerizations in an all-hydrocarbon system. (Note Example 1, above.)

Thus it has been demonstrated that the present invention is capable of providing a highly economical, effective butyl rubber polymerization catalytic process which employs a comparatively inexpensive solvent diluent; requires less refrigeration (due to its ability to polymerize butyl rubber at higher temperatures than conventional butyl rubber processes); enables excellent control of the molecular weight of the product in the high molecular weight range, viz., especially greater than 500,000 (based on viscosity average measurements); insures good control over the polymerization process itself with respect to the temperature range used for polymerization; and results in minimizing reactor fouling and clogging of reactor lines due to the fact that the butyl rubber copolymer produced is present as a stable solution of butyl rubber in the aliphatic hydrocarbon diluent. Moreover, the catalyst handling in accordance with the practice of this invention is far more convenient because the two catalyst components can, and preferably are, premixed and stored in a solution ready for direct use to catalyze butyl rubber polymerizations. Furthermore, the butyl rubber product is produced in accordance with this invention in the form of a butyl rubber solution in the aliphatic hydrocarbon diluent, viz., a butyl rubber cement, which is suitable for direct additional chemical reactions or processing, e.g., chlorination, bromination, preparation of butyl rubber latex, etc., in accordance with conventional procedures.

What is claimed is:

1. A process for preparing solution butyl rubber polymers having viscosity average molecular weights >450,000 which comprises contacting a $C_4$ to $C_8$ monoolefin monomer with a $C_4$ to $C_{14}$ multiolefin monomer at temperatures ranging from about −125 to −50° F. in the presence of an aliphatic hydrocarbon diluent and a catalyst mixture comprising a major amount of a dialkyl aluminum halide and a minor amount of a monoalkyl aluminum dihalide.

2. A process according to claim 1 wherein said catalyst mixture contains from about 80 to about 99 mol percent of the dialkyl aluminum halide and from about 1 to about 20 mol percent of the monoalkyl aluminum dihalide.

3. A process according to claim 1 wherein said diluent is a $C_4$ to $C_8$ saturated aliphatic hydrocarbon.

4. A process according to claim 1 wherein said $C_4$ to $C_8$ monoolefin is an isomonoolefin.

5. A process according to claim 1 wherein said $C_4$ to $C_{14}$ multiolefin is a $C_4$ to $C_{10}$ conjugated diolefin.

6. A process according to claim 1 wherein from 0.01 to about 2.0 wt. percent of said dialkyl aluminum halide and from 0.002 to about 0.4 wt. percent of said monoalkyl aluminum dihalide are employed, based on the total of said monomers present.

7. A process according to claim 1 wherein said temperatures range from about $-110$ to $-90°$ F.

8. A process for preparing solution butyl rubber polymers having viscosity average molecular weights >500,000 equivalent to three minute Mooney viscosities at 260° F. of >40 which comprises reacting a $C_4$ to $C_8$ isomonoolefin with a $C_4$ to $C_{10}$ conjugated diolefin at temperatures ranging from about $-110$ to $-90°$ F. in the presence of a $C_4$ to $C_8$ paraffinic diluent and a catalyst mixture composed of from about 85 to about 99 mol percent of a $C_2$ to $C_{16}$ dialkyl aluminum halide component wherein each alkyl group contains from 1 to 8 carbon atoms and from about 1 to about 15 mol percent of a $C_1$ to $C_8$ monoalkyl aluminum dihalide component wherein each alkyl group contains from 1 to 8 carbon atoms.

9. A process according to claim 8 wherein said dialkyl aluminum halide is a $C_2$ to $C_8$ dialkyl aluminum chloride wherein each alkyl group contains from 1 to 4 carbon atoms.

10. A process according to claim 8 wherein said monoalkyl aluminum dihalide is a $C_1$ to $C_4$ aluminum dichloride.

11. A process according to claim 8 wherein said catalyst components are dissolved in a portion of said diluent to form a dilute solution thereof containing <50 wt. percent catalyst components and said dilute solution of said catalyst components is employed as a polymerization catalyst mixture.

12. A process according to claim 8 wherein said $C_4$ to $C_8$ isomonoolefin is employed in concentrations ranging from about 70 to 99.5 parts by weight and said $C_4$ to $C_{10}$ conjugated diolefin is employed in concentrations ranging from about 0.5 to 30 parts by weight for each 100 weight parts of said monomers reacted.

No references cited.

JOSEPH L. SCHOFER, *Primary Examiner.*

R. A. GAITHER, *Assistant Examiner.*